United States Patent [19]

Morris

[11] 4,078,041
[45] Mar. 7, 1978

[54] ELECTROFLUIDIZED BED GAS PURIFICATION ARRANGEMENT AND METHOD

[75] Inventor: John M. Morris, Louisville, Ky.

[73] Assignee: Rexnord Inc., Racine, Wis.

[21] Appl. No.: 662,596

[22] Filed: Mar. 1, 1976

[51] Int. Cl.² .................................................. B01D 53/34
[52] U.S. Cl. ................................... 423/210; 423/215.5; 423/244; 423/239; 55/2; 204/164
[58] Field of Search ...................... 423/210, 215.5, 230, 423/231, 244, 239, 247; 55/2, 5, 7, 6; 204/164, 174, 177

[56] References Cited

U.S. PATENT DOCUMENTS

| | | | |
|---|---|---|---|
| 2,581,135 | 1/1952 | Odell | 423/230 X |
| 3,304,249 | 2/1967 | Katz | 204/164 |

Primary Examiner—Earl C. Thomas

Attorney, Agent, or Firm—Edward M. Steutermann

[57] ABSTRACT

A chemically reactive electro-fluidized bed gas purification arrangement and method for cleaning a dirty gas stream including chemically reactive materials and entrained particulate materials wherein means are provided to impose a selected electrical charge upon the entrained particulate materials, and wherein the dirty gas stream is contacted with at least one fluidized bed of particulate purification material including reagent material of selected chemical composition receptive to combination with the chemically reactive materials of the dirty gas stream where the reactive bed can be electro-fluidized and the dirty gas stream is passed through at least one electro-fluidized bed where the electrical charged particulate matter entrained in the dirty gas stream adhers to particles of the electro-fluidized bed which act as electro-static collection sites for the particulate material.

9 Claims, 3 Drawing Figures

ELECTROFLUIDIZED BED GAS PURIFICATION ARRANGEMENT AND METHOD

BACKGROUND OF THE INVENTION

Various prior art arrangements are known for removal of noxious gases and particulate matter from dirty gas streams. Such prior art devices have, in general, required different processes for removal of the noxious materials and the particulate materials and have not been particularly suitable for use in high pressure or high temperature applications because such methods have generally resulted in cooling and/or depressurization of gas during or prior to treatment with resulting loss in enthalpy. Most such prior processes have accomplished gas cleaning by contacting the gas with a liquid to remove the undesirable impurities and reduce both the temperature and pressure of the gas.

No known art arrangement is suitable for the simultaneous and cooperative removal of noxious and particulate materials for example from the combustion products resulting from the combustion of fuels such as coal. Furthermore, no prior art arrangements are available for the simultaneous removal of noxious gases and particulate matter in a dry system with a minimum enthalpy loss through the system by utilization of electrofluidized beds.

In certain applications, particularly in view of the need for high efficiency fuel utilization, it is advantageous to utilize combustion products from the combustion of certain fossil fuels directly in the operation of power generating equipment such as rotary turbines. Satisfactory operation of such turbines depends on a supply of clean noncorrosive high energy fluid such as combustion gas. More particulately, no prior art arrangements are available to remove noxious gases and particulate material from combustion gas streams prior to introduction to a rotary turbine so that direct utilization of combustion gases for power production is generally precluded by present gas purification equipment.

SUMMARY OF THE INVENTION

The present invention provides a chemically reactive electro-fluidized bed gas purification arrangement and method particularly useful in the purification of combustion gases from the combustion of fossil fuels to provide a clean hot gas at a high pressure, for example, in the operation of rotary electric generating equipment.

The present invention is particularly useful in that it provides a method and apparatus for dry separation of undesirable components of combustion gases wherein the same particulate material can be used for the removal of noxious materials and particulate matter from the combustion products and fully eliminates the need for liquid collector arrangements. More particulatly, the present invention provides method and apparatus where the combustion gases can be maintained at temperatures in the range of 1100° F. to 1800° F. at presures in the range of 300–500 P.S.I.G. for delivery to power generating equipment.

More particularly, the present invention provides a chemically reactive electro-fluidized bed gas purification arrangement and method for cleaning a stream of dirty gas, including chemically reactive components and particulate materials, wherein the dirty gas stream is contacted with at least one first fluidized bed of particulate purification material of selected chemical composition receptive to combination with the chemically reactive components of the dirty gas stream where the first fluidized bed can be electrofluidized, means are provided to impose a selected electrical charge upon the particulate materials entrained in the dirty gas, the stream is contacted with at least one second electro-fluidized bed of particulate purification material used in the first bed wherein the particulate purification materials act as electrostatic collection sites for removal of the particulate material entrained in the gas stream.

BRIEF DESCRIPTION OF THE DRAWINGS

Referring now to the Figures which illustrate examples of a method and two arrangements in accordance with the present invention:

Referring now to FIG. 1, which shows one example of an apparatus in accordance with the present invention, a vessel 1, which can be a fully enclosed pressure vessel designed and constructed of material capable of withstanding extremely high operating temperatures and pressures, is provided. It will be recognized that within the scope of the present invention, apparatus can be provided to accomplish the method of the present invention, as described hereinafter, in more than one vessel and in more than one stage for example, as shown in FIG. 3. Vessel 1 as shown in FIG. 1, can be divided by means of a gas impervious partition 2 into a first stage treatment chamber 3 and a second stage treatment chamber 4. A raw or dirty gas inlet 6 is provided to communicate with chamber 3, as shown, and is connected to a selected source of raw gas, or dirty gas, to be treated in the apparatus as described hereinafter.

Figure 1:
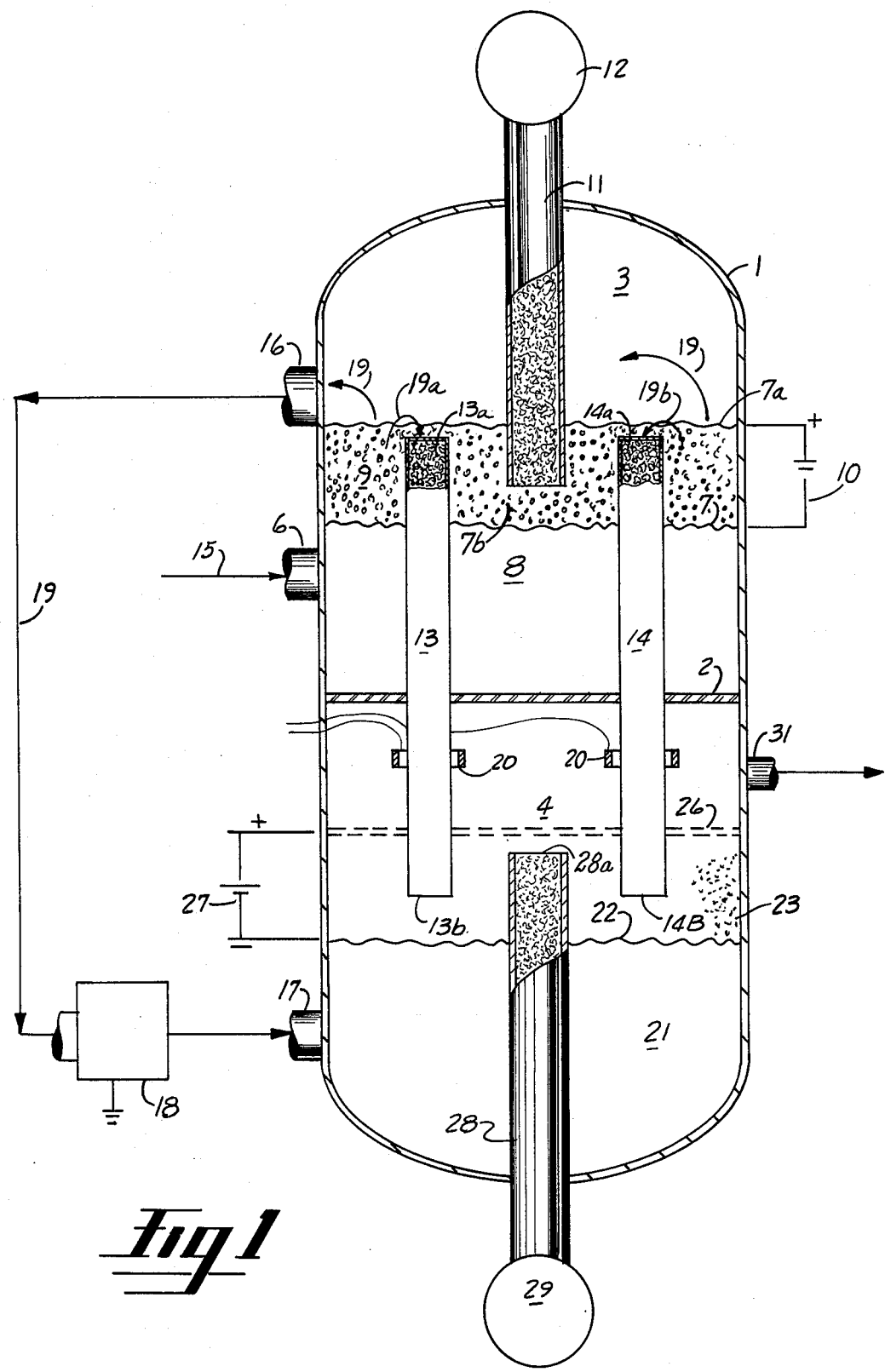
FIG. 1 is a schematic view, in section, of one arrangement of an apparatus in accordance with the present invention.

A gas permeable member, for example a grid 7 can be disposed transversely within chamber 3 to define an inlet plenum 8. Grid 7 is advantageously provided with openings therein which can be selected to satisfy pressure drop and structural design specifications. A second gas permeable grid 7a can be disposed in spaced relation above grid 7 to define an area therebetween to contain an electro-fluidized bed 9 of particulate material suitable for reaction with certain of the chemically reactive components of the raw gas stream admitted through inlet 6 as the dirty gas stream flows upwardly through the openings of the screen 7. The rate of flow of gas through bed 9 can be high enough to fluidize a portion of the particles of reagent of bed 9.

In accordance with one feature of the present invention, the particulate material utilized can be a reagent which combines either physically or chemically with the undesirable chemical components carried in the dirty gas stream.

For example, when the apparatus is used in connection with the purification of combustion gases, bed 9 can advantageously be provided with a reagent such as lime (CaO), magnesium oxide (MgO) or nahcolite ore. The reagent, for example, CaO, can be supplied to chamber 3 as described hereinafter for reaction and removal of sulphur oxides such as $SO_2$. The sulphur oxides admitted to chamber 3 are, upon reaction with the lime, reacted to calcium sulphate Ca SO$_4$.

Further, in accordance with one feature of the present invention, means can be provided to electro-fluidize bed 9. In the example shown in FIG. 1, an electrical source 10, which can be a direct current power source, is provided to impose a positive charge on grid 7a and a negative charge on grid 7.

Thus, when grids 7 and 7a are charged as indicated, an electrostatic field is established between the grids and the field is imposed on the particles of bed 9. It has been found that, particularly where the particles of bed 9 are very small, imposition of the electric field orients the charge on the surface of the particles so that the bed particles sustain positive and negative charges on opposite ends. The relative charges established on the surface of the particles and the imposition of the field across the bed area promotes fluidization of the particulate bed so that thorough fluidization of extremely small particles is possible where attempts at fluidization by gas flow would fail because the gas would merely "channel" through the bed. Electrofluidization, it has been found, provides a uniformly distributed particulate bed where the effective reactive surface of the reagent particles is greatly enhanced so that gas residence time in the reactive bed can be reduced for effective removal of unwanted chemical compounds carried by the gas stream prior to electrostatic removal of particulate material by the same, or other, particles during a second stage.

It will be further recognized that imposition of a charge on grids 7 and 7a does not ordinarily result in current flow, the only such flow resulting from current flowing as a result of random charged particles striking one of the grids. Further, it will be recognized that there is no significant net electrical charge in bed 9. While individual particles may acquire a predominant change, the entire bed remains essentially electrically neutral, since the characteristics relied upon result principally from the orientation of electrical charges on the surface of the particles as well as aggregation of charges on particles.

In the example of an apparatus in accordance with the present invention shown, lime, or other reagent, is supplied to bed 9 by means of inlet duct 11 which can be disposed to extend into chamber 3 a selected distance in generally parallel relation with respect to the longitudinal axis of vessel 1 and terminate between grids 7 and 7a. A supply hopper 41 (FIG. 2) can be provided to communicate with duct 11 to supply reagent to bed 9 and a feeder lock 12 is provided in duct 11 upstream of the entrance to vessel 1 to control the supply of lime, or other reagent, fed into vessel 1 to accumulate on grid 7 to form bed 9.

Internal transfer tubes 13 and 14 can be provided to conduct overflow reagent from bed 9 to a second bed 23 described hereinafter. Transfer tubes 13 and 14 can be disposed in vessel 1 in spaced parallel relation extending through partition 2 and gas permeable grid 7 as shown. The upper ends of tubes 13 and 14 which provide inlets 13a and 13b are located a selected distance above grid 7 but below grid 7a, as shown, and can advantageously be adapted to terminate in a plane transverse to the longitudinal axis of vessel 1. The lower ends of tubes 13 and 14 can be adapted to terminate in outlets 13B and 14B in a plane transverse to the longitudinal axis of vessel 1 a selected distance below grid 26 as described hereinafter.

While the example of the present invention as shown in the Figure illustrates an apparatus with two transfer tubes, it will be recognized that apparatus within the scope of the present invention can be adapted to provide one or more reagent transfer means and that such transfer means are not limited to tubes.

Transfer tubes 13 and 14 are provided for transfer of particulate material from bed 9 to bed 23, described hereinafter, and the overall size and location of tubes 13 and 14, or other or fewer ducts, can be selected to provide desired distribution of particulate matter delivered to bed 23.

Gas which has been admitted to plenum 8 of chamber 3 passes through bed 9 for contact with the reagent of bed 9 and removal of selected undesirable components or noxious components such as sulfur oxides or nitrogen oxides carried by the gas stream and the gas which has been treated is emitted from chamber 3 by means of an outlet 16. Within the scope of the present invention, the noxious elements can be removed by adsorptive, absorptive or chemical reaction with the reagent.

As previously described, the particles of bed 9 are fluidized both by gas flow and by the electrostatic field imposed by grids 7 and 7a. The electrostatic field which provides the surface charge distributed on the particles of bed 9, and the positive and negative charge imposed on grids 7 and 7a further prevent escape of significant quantities of particulate matter from the area between grids 7 and 7a.

The gas emitted through outlet 16 can then be conducted to an inlet 17 of chamber 4, as shown.

In accordance with another feature of the present invention, a particle charging station 18 is provided as shown in association with the gas stream 19 emitted from chamber 3 to impose an electrostatic charge of selected polarity on particulate matter entrained in the gas stream 19 emitted from outlet 16 of chamber 3.

For example, particle charging section 18 can be adapted to impose a charge of selected polarity for example a negative charge on the particulate matter entrained in gas stream 19 which is then admitted to dirty gas inlet 17 of chamber 21, as shown.

In the example shown, a gas permeable grid 22 is disposed in chamber 4 in a position generally transverse to the longitudinal axis of vessel 1 and is adapted to permit upward flow of gas through the grid to contact a media bed 23 composed of reagent overflowing from bed 9 through transfer conduits 13 and 14, as shown.

Outlets 13B and 14B of transfer conduits 13 and 14 are, advantageously disposed a selected distance above grid 22 and beneath the upper surface of fluidized bed 23.

Additionally, charging collar means 20 can be provided to impose an electrical charge on the particles overflowing from bed 9 to bed 23 but it will be recognized that in many applications, it is not necessary to impose a charge on the reagent overflowing from bed 9 because the particles retain their charge.

A second grid 26 is provided a selected distance above and generally parallel to grid 22 where transfer tubes 13 and 14 extend through grid 26 into the area defined between grids 22 and 26 wherein bed 23 is confined as described hereinafter.

Advantageously, grids 22 and 26 can be adapted to be electrostatically charged by means of an electrical source 27 to establish an electrical field therebetween for electrofluidization of bed 23 as described with respect to bed 9.

As previously described, reagent which overflows from reagent bed 9 is transferred through ducts 13 and 14 to be received in the area between grids 22 and 26 where the particles 7b of a bed of particulate material 9 can be fluidized by the gas flowing upwardly through the grids and electrofluidized by the electrical field established between grids 7 and 7a as previously described.

A media outlet duct 28 is provided to extend through the bottom of vessel 1 into bed 23 and is further provided with a feeder lock outlet valve 29 to regulate the rate of emission of particulate matter from vessel 1. Particulate matter from fluidized bed 23 overflows into inlet 28a of outlet duct 28 for emission from vessel 1, as shown.

A clean gas outlet 31 can be provided in chamber 4 above grid 26 for emission of cleaned gas from vessel 1, as shown.

In operation, raw gas stream 15 is admitted to chamber 3 of vessel 1, through inlet duct 6, to flow upwardly through bed 9 thereby, in cooperation with the electrical field between grids 7 and 7a electrofluidizing bed 9. The chemically reactive compounds carried in the gas stream are reacted with the reagent of bed 9 and the reaction is enhanced by the large reactive area provided by electrofluidization of bed 9. The gas from bed 9 is then emitted from vessel 1 by means of outlet 16.

The noxious compound free gas stream 19 is then passed through particle charging station 18 where, for example, a net negative charged is imposed on particulate matter entrained in the gas stream.

It will be noted that a portion 19a of stream 19 flows downwardly through transfer tubes 13 and 14 as shown along with reagent particles from bed 9 and is received in the area between grids 22 and 26 to provide material for bed 23.

Gas stream 19 carrying charged, entrained, particulate matter is admitted through gas inlet 17 to chamber 4 and flows upwardly through grid 22 to fluidized particulate reagent bed 23 where the negatively charged particulate material entrained in the gas stream electrostatically adhers to the particulate material of fluidized reagent bed 23. As previously described, fluidized reagent bed 23 includes particulate reagent overflowing from bed 9 where an electrical charge can be imposed on the particles flowing through transfer tubes 13 and 14.

As gas stream 19 flows through bed 23, the charged particles entrained in stream 19 adher to the particles of electrofluidized bed 23 and are removed. As previously described with respect to bed 9, the particles of bed 23 are prevented from escaping from the area between grids 22 and 26 by the electrostatic field imposed by grids 26 and 22 and a clean gas stream is emitted through outlet 31 from vessel 1.

The reagent, for example, lime, is admitted to vessel 1 by means of feeder lock 12 and inlet duct 11 where the lime accumulates in bed 9. Reagent is continuously fed to bed 9 and eventually overflows to inlets 13B and 14B of ducts 13 and 14 to flow through the ducts to bed 23 of chamber 4.

The dirty gas stream admitted to inlet 6 can be of a temperature in the range of 1100°–1800° F. and the high gas temperature promotes the reaction of noxious components, for example sulfur oxides, with the reagent, for example lime, provided by bed 9.

Bed 9 is electrofluidized as previously described. Ducts 13 and 14 are provided primarily for transfer of particulate material overflowing from bed 9 but it will be recognized that gas flow represented by stream 19a and 19b also occurs. Gas stream 19a and 19b carry some entrained particulate material from bed 9 to bed 23. The rate of flow of gas through ducts 13 and 14 can be controlled by overall pressure differences between chambers 3 and 4 as well as the effective flow area of the transfer ducts. Gas streams 19a and 19b, advantageously also provide means for distribution of particulate material in bed 23.

It will be further recognized that electrofluidization of bed 23 enhances contact between the particles of bed 23 and the particulate material carried in gas stream 19 to promote electrostatic removal of the particulate material.

Figure 3:
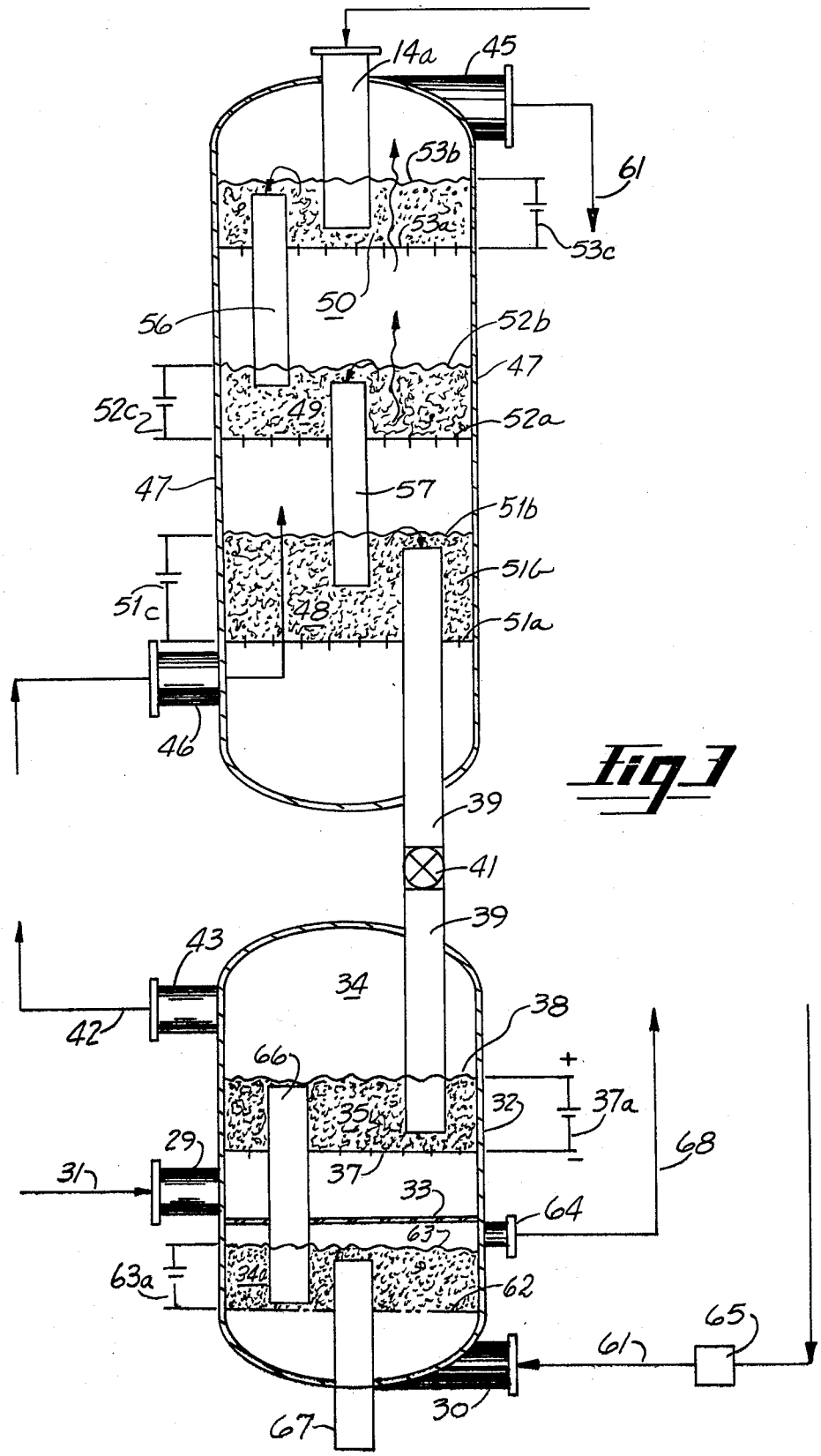
FIG. 3 is a schematic view, in section, of another arrangement in accordance with the present invention.

FIG. 3 shows another example of an arrangement within the scope of the present invention wherein multiple stages are utilized for removal of particulate and chemically reactive components of a dirty gas stream 31.

A vessel 32 is provided to receive gas stream 31 for electrostatic removal of particulate matter where a gas pervious partition 33 is provided to divide vessel 32 into two chambers 34 and 34a. Particulate material, for example lime particles, is introduced to an area defined between gas permeable grids 37–38 by means of an inlet duct 39, including a feeder lock 41 to form an electrofluidized bed 35 as previously described where grids 37 and 38 are adapted to be charged as shown by power source 37a. Gas stream 31 can be admitted to vessel 32 by means of an inlet 29 and can be submitted to a device, not shown, to provide particulate matter entrained therein with a charge of negative polarity to facilitate electrostatic removal of particulate matter in bed 35. Thus at least a portion of the particulate matter entrained in dirty gas stream 31 is removed before first stage cleaned gas stream 42 is emitted from outlet 43 of chamber 34.

First stage cleaned gas stream 42 is admitted to a vessel 47 by means of an inlet 46 for removal of noxious chemical compounds from the gas stream. Vessel 46 can be adapted to provide three electro-fluidized beds 48, 49, and 50 defined between gas permeable grids 51a-b, 52a-b, and 53a-b, respectively. The particulate material utilized in the beds can be initially supplied by means of an inlet duct 14a where duct 14a terminates at a selected location between grids 53a and 53b.

The particulate material of beds 48–50 can be of the same character as previously described with respect to the arrangement shown in FIG. 1 and can be selected to react with selected undesirable chemicals carried in gas stream 42, for example sulfur oxides.

An electrostatic field is established between grids 51a-b, 52a-b and 53a-b by means of electrical power source 51c-53c, as shown where sources 51c-53c can include a source of direct current or alternating current to provide an electrical field for fluidization of beds 48–50 as previously described with respect to beds 9 and 23 of the example of FIG. 1.

In the example shown, three beds 48–50 are provided for reaction of noxious gases carried in the dirty gas stream but in other examples as shown in FIG. 3, fewer or more electrofluidized reagent beds can be provided as needed. The present invention recognizing that electrofluidization of the beds increases the effective surface area of the ragent thereby providing and facilitating removal of noxious components from the gas stream.

As shown, internal transfer ducts 56 and 57 can be provided to transfer the particulate reagent material from bed 50 to bed 49 and bed 48. The particulate material on bed 48 is then emitted from vessel 47 by means of duct 39 and flows through feeder lock 41 to vessel 32 as previously described, for subsequent treatment or disposal.

It has been found that arrangements as shown in FIG. 3, where the dirty gas stream is passed through multiple beds and is alternatively passed through a first bed for initial removal of particulate matter then through electrofluidized beds for removal of noxious compounds and finally through another electrofluidized bed for removal of particulate matter, enhance the removal of noxious elements of the gas stream, for example sulfur oxides, when lime is utilized as the reacting reagent.

An essentially noxious compound free gas stream 61 is emitted from vessel 47 through outlet 45 and is returned to inlet 30 of vessel 32 where the gas flows through gas permeable grids 62 and 63 and an electrofluidized bed 36 composed of particulate material overflowing from bed 35 through duct 66. An electrical field is established between grids 62 and 63 by an electrical source 63a to establish electrofluidization of bed 36 as previously discussed. A charging device 65, as known in the art, can be provided to impose a charge of selected polarity, for example negative, on particles entrained in gas stream 61 so that the particles are removed by electrostatic adherence to the particles of bed 36.

An outlet duct 68 can be provided to communicate with bed 36 for emission of particulate material from vessel 32. The cleaned gas stream 68 is emitted from vessel 32 by means of outlet 64.

Figure 2:
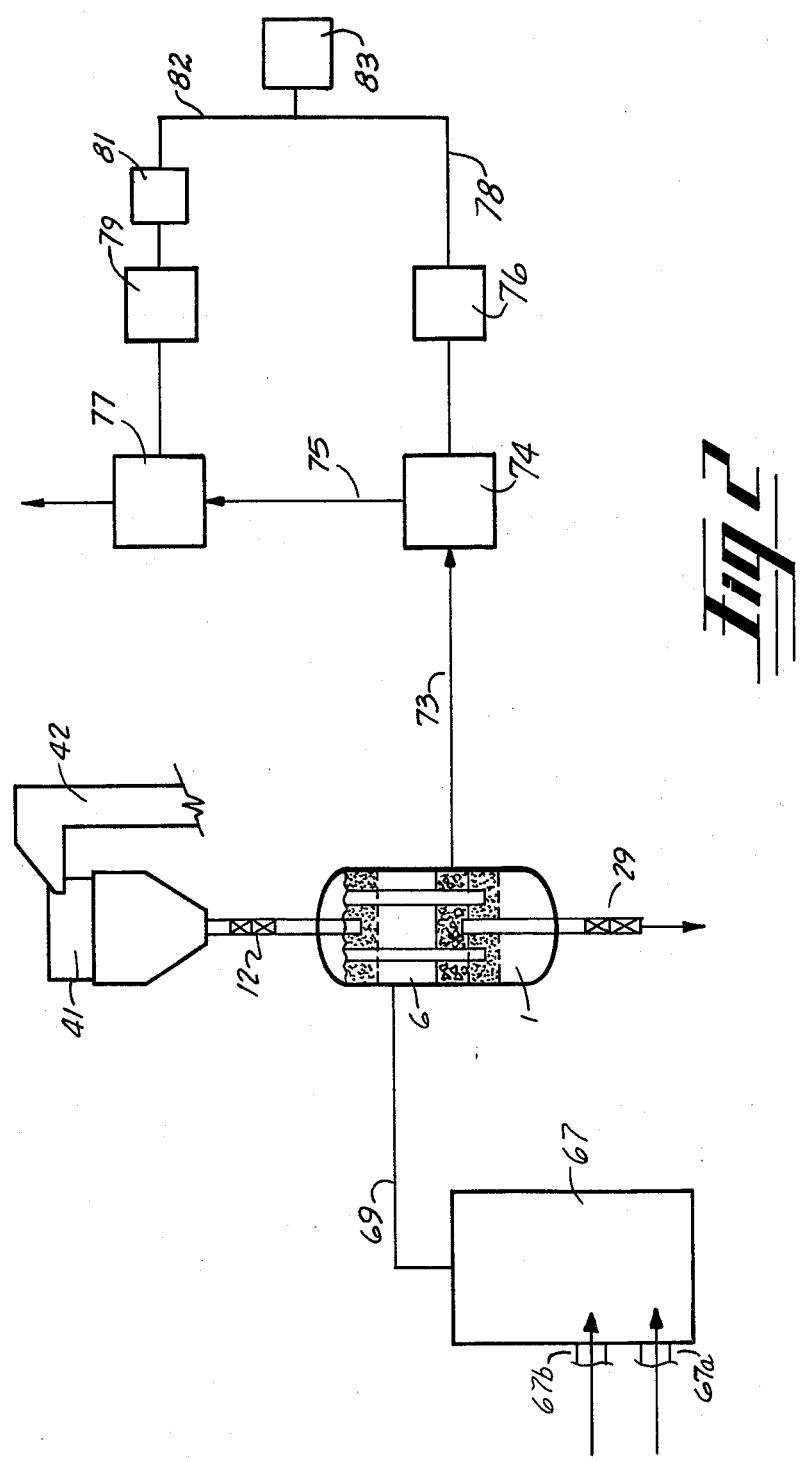
FIG. 2 is an illustration of an application of the collector shown in FIG. 1 in an arrangement for direct generation of electrical power from combustion products.

Referring now to FIG. 2 which shows one example of an application of the apparatus and method in accordance with the example of the present invention shown in FIG. 1, a combuster 67 is provided with a source 67 of primary fuel and air and a source 67b of secondary air. The fuel, for example, ¼ inch mill ground coal is burned in combuster 66 providing a generally high pressure, high temperature exhaust gas stream 69 which may be in the range of 300 to 500 pounds per square inch at up to 1800° F. Stream 69 is typical combustion gas effluent of high enthalpy containing noxious elements as well as particulate material and provides a significant source of energy. The stream is useful as a high temperature high pressure source of energy except for the foreign materials which would corrode and erode equipment to which the gas is supplied. The raw gas is then admitted to vessel 6 which is similar to the device shown in FIG. 1 where the combustion gas is cleaned for use as a power source, as previously described with respect to FIG. 1, without significant loss of pressure or sensible heat so there is little loss of enthalpy in purification.

A lime hopper 41 is provided, and is supplied with lime by an elevator 42, where the lime is fed through lock 12 to vessel 1 as previously described. Reacted lime, bearing particulate matter and reacted noxious elements removed from stream 69 is emitted from vessel 1 through lock 29, as shown, and the particulate matter is then discarded or reprocessed. Cleaned gas stream 73 is emitted from vessel 1 and is supplied as a clean, dry, gas stream to a gas turbine 74 which drives a generator 76 to provide a source of electrical power 78. The total enthalpy of gas stream 73 is reduced in operation of turbine 74 by reduction, principally of pressure, and the exhaust gas stream 75 emitted from turbine 74 still contains significant recoverable energy in the form of sensible heat. The exhaust gas stream is then supplied to a waste heat boiler 77 for recovery of sensible heat. Steam generated in boiler 77 is used to drive a steam turbine 79 which in turn drives a generator 81 to generate electrical power 82 to be supplied to a main station 83 along with the power generated by generator 76.

It will be understood that the foregoing are but a few examples of apparatus and method in accordance with the present invention and that various other features of the present invention, within the scope of the invention, will become obvious to those skilled in the art upon reading the disclosure set forth hereinbefore as that the scope of the invention is limited only by the claims appended hereto.

The invention claimed is:

1. A chemically reactive electrofluidized bed gas purification method for cleaning a dirty gas stream with entrained chemically reactive components and particulate materials including: imposing a selected electrostatic charge upon said particulate materials entrained in said dirty gas stream; contacting said dirty gas stream with at least one electrofluidized bed of selected particulate treating material including reagent material of selected chemical composition receptive to combination with said chemically reactive components of said dirty gas stream; and passing said dirty gas stream through at least one second electrofluidized bed of said particulate treating material where electrostatic charge is imposed on the particles of said second fluidized bed of particulate treating material so said electrically charged particulate matter entrained in said dirty gas stream adheres to the particules of said second fluidized bed which acts as electrostatic collection sites for the particulate material entrained in said dirty gas stream.

2. The method of claim 1 wherein said dirty gas stream is passed upwardly through at least one first bed of said treating particulate purification material to partially fluidize said bed and wherein a portion of said chemically reactive components of said gas stream react with said reagent of said bed prior to imposition of an electrical charge on the particulate materials entrained in said gas stream.

3. The method of claim 2 including: collecting the gas passed through said first bed of said particulate treating purification material; imposing electrical charge of selected polarity on particulate material entrained therein, and, passing said stream of collected gas through electrostatic precipitator means to remove said charged particulate material from said collected gas stream.

4. The method of claim 3 wherein said electrostatic precipitator means includes the process of: forming at least one second bed of treating particulate material received from said first bed; imposing an electrical field across said bed of treating particulate material to electrofluidize said bed; and passing said collected gas stream through said fluidized bed of treating particulate material.

5. The method of claim 4 including: disposing said second bed of treating particulate material between first and second gas permeable grid means; imposing an electrostatic field between said first grid and second grid means; and, passing said collected gas stream through said first grid, said second bed of treating particulate material and said second grid.

6. The method of claim 5 including transferring treating particulate material from said first fluidized bed means to said second fluidized bed means.

7. The method of claim 6 wherein a selected electrical charge is imposed on said particulate material transferred from said first bed means to said second bed means.

8. A method of removing particulate material and chemical components from a dirty gas stream including; passing said dirty gas stream through at least one first bed of treating particulate material including reagent receptive to combination with selected chemical components of said dirty gas stream to remove a portion of said chemical components; imposing an electrostatic field across said first bed to electrofluidize said first bed; collecting a first gas stream emitted from said first bed; imposing an electrostatic charge of selected polarity on particulate material entrained in said first gas stream; passing said first gas stream to at least one second fluidized bed of treating particulate material; disposing said second bed means between first and second gas permeable grid means; imposing an electrostatic field between said first grid means and said second grid means; passing said first gas stream sequentially through said first grid means, said second bed, and said second grid means to remove said entrained particulate material from said first gas stream; collecting the gas emitted from said second bed as a second gas stream; and transferring a portion of the treating particulate material from said first fluidized bed means to said second fluidized bed means.

9. The method of claim 8 wherein a portion of said first gas stream is passed directly from said first bed of fluidized treating particulate material to said second bed where said portion of said first gas stream carries entrained particulate material from said first bed to said second bed.

* * * * *